(12) United States Patent
Guering et al.

(10) Patent No.: US 8,167,239 B2
(45) Date of Patent: May 1, 2012

(54) TURBOJET FOR AIRCRAFT, AIRCRAFT EQUIPPED WITH SUCH A TURBOJET, AND METHOD FOR MOUNTING SUCH A TURBOJET ON AN AIRCRAFT

(75) Inventors: Bernard Guering, Montrabe (FR); Olivier Teulou, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 771 days.

(21) Appl. No.: 12/067,748

(22) PCT Filed: Sep. 5, 2006

(86) PCT No.: PCT/FR2006/050841
§ 371 (c)(1),
(2), (4) Date: Sep. 19, 2008

(87) PCT Pub. No.: WO2007/034094
PCT Pub. Date: Mar. 29, 2007

(65) Prior Publication Data
US 2009/0078819 A1    Mar. 26, 2009

(30) Foreign Application Priority Data
Sep. 23, 2005  (FR) ...................................... 05 52830

(51) Int. Cl.
*B64D 27/00*  (2006.01)
(52) U.S. Cl. .......................................... 244/55; 244/54

(58) Field of Classification Search .................... 244/55, 244/54, 119, 120
See application file for complete search history.

(56) References Cited

U.S. PATENT DOCUMENTS

| 2,580,484 | A | | 1/1952 | Temte |
| 3,075,728 | A | * | 1/1963 | Kogan ............................ 244/74 |
| 3,666,211 | A | * | 5/1972 | Cathers et al. .................. 244/54 |
| 3,807,665 | A | * | 4/1974 | Coombe ......................... 244/55 |
| 3,936,017 | A | * | 2/1976 | Blythe et al. ............... 244/110 B |
| 5,957,405 | A | | 9/1999 | Williams et al. |
| 6,089,504 | A | * | 7/2000 | Williams et al. ............ 244/53 B |
| 7,107,755 | B2 | * | 9/2006 | El Hamel et al. ............... 60/224 |
| 7,581,694 | B2 | * | 9/2009 | Guering ...................... 244/53 B |
| 2003/0146344 | A1 | * | 8/2003 | Saito et al. ........................ 244/55 |

FOREIGN PATENT DOCUMENTS

JP  31006551  9/1954
JP  2000345858 A  12/2000

OTHER PUBLICATIONS

Japanese Office Action dated Oct. 18, 2011.

* cited by examiner

*Primary Examiner* — Christopher P Ellis
(74) *Attorney, Agent, or Firm* — Perman & Green, LLP

(57) ABSTRACT

The disclosed embodiments relates to a jet engine for an aircraft, characterized in that it bears at least one stabilizer, the stabilizer being fastened on the rigid structure of said jet engine so as to form a one-piece assembly. The jet engine can also bear one or more auxiliary devices required for the operation of the jet engine. The disclosed embodiments also relates to an aircraft provided with such a jet engine, and to a method of mounting such a jet engine on an aircraft.

12 Claims, 1 Drawing Sheet

TURBOJET FOR AIRCRAFT, AIRCRAFT EQUIPPED WITH SUCH A TURBOJET, AND METHOD FOR MOUNTING SUCH A TURBOJET ON AN AIRCRAFT

CROSS-REFERENCE TO RELATED APPLICATIONS

This application is the National Stage of International Application No. PCT/FR2006/050841, International Filing Date, 2006 Sep. 5, which designated the United States of America, and which international application was published under PCT Article 21(2) as WO Publication No. WO 2007/034094 and which claims the benefit of and priority from French Application No. 0552830, filed 2005 Sep. 23, the disclosures of which are incorporated herein by reference in their entirety.

BACKGROUND

1. Field

The disclosed embodiments relate to a jet engine for an aircraft. More specifically, the disclosed embodiments relate to a jet engine intended to be mounted in an aft position on the fuselage of an aircraft. The disclosed embodiments also relate to a way of mounting the jet engine on an aircraft.

The disclosed embodiments can generally be applied in the aeronautical field and, more particularly, to supersonic aircraft, the fuselage diameter of which is small.

2. Brief Description

An aircraft generally comprises one or more stabilizers situated in the upper aft section of the fuselage of said aircraft. For example, an aircraft comprises a vertical stabilizer and two horizontal stabilizers, or only two stabilizers set obliquely with respect to the longitudinal axis of the aircraft. These stabilizers are required to provide stability for the aircraft in its flight path. The stabilizers are fastened directly to the upper aft section of the fuselage.

Also known are aircraft provided with at least three jet engines. Each wing is provided at its underside with at least one jet engine. An additional jet engine, referred to as an aft jet engine in the following, is situated in the aft section of the aircraft fuselage at the aft vertical stabilizer of said aircraft. The vertical stabilizer is fastened directly on the structure of the aircraft via semicircular hoops forming the supporting structure of the vertical stabilizer. More precisely, the vertical stabilizer is connected at its left side to the left side of the fuselage by a first set of hoops and at its right side to the right side of the fuselage by a second set of hoops. The semicircular hoops of the two sets are arranged in pairs, on either side of the stabilizer, so as to form a circular cylindrical housing into which the aft jet engine is slid. The aft jet engine itself is then attached directly to the fuselage of the aircraft by a second supporting structure and also to the hoops of the vertical stabilizer.

The hoops must form a sufficiently large housing to accommodate the aft jet engine within its diameter. The wider the aft jet engine, the larger must be the housing, a situation which tends to create considerable aerodynamic drag at the rear of the fuselage. The aerodynamic drag is commensurately greater as the diameter of the jet engine increases with respect to the diameter of the fuselage in the aft section. For example, it is not currently possible for a large-diameter subsonic jet engine to be integrated at the rear of the fuselage of a supersonic aircraft, the fuselage diameter of which is small, especially in the aft section, since the aerodynamic drag created by the supporting structures forming the fastening system of the prior art would then be excessive.

Moreover, the vertical stabilizer and the aft jet engine each have an independent supporting structure for connecting them independently of one another to the fuselage of the aircraft. These multiplied supporting structures tend to considerably increase the total mass of the aircraft.

SUMMARY

One object of the disclosed embodiments is thus to provide a system for fastening an aft jet engine in an upper aft position of the fuselage of an aircraft, in which the impact of this system on the aerodynamic drag is low. Another object of the disclosed embodiments is to provide such a fastening system having a reduced mass in relation to the fastening system of the prior art. An additional object of the disclosed embodiments is to facilitate the mounting and assembly of an aft jet engine and a vertical stabilizer in an upper aft position of the fuselage of an aircraft.

To achieve this result, the disclosed embodiments provide that one or more stabilizers of an aircraft be integrated with an engine intended to be mounted in the upper aft section of the fuselage of said aircraft. Thus, it is no longer the fuselage that supports the stabilizers but the engine itself. The engine and the stabilizer(s) fastened securely to the structure of the engine form an integrated or one-piece system. This integrated system can then be fastened as a single unit to the fuselage of the aircraft. It is thus possible to reduce the number of supporting structures on the aft section of the fuselage, since only the engine is fastened to the fuselage, the stabilizer(s) being simply connected to the fuselage via their engine fastenings. By partly eliminating the stabilizer supporting structures around the engine, it is also possible to reduce the aerodynamic drag at this point. Indeed, up until now, the engine was surrounded by bulky supporting structures connecting the vertical stabilizer to the aircraft, thus increasing the overall size of the engine/stabilizer module.

Advantageously, the integrated system according to the disclosed embodiments also comprises one or more of the auxiliary devices required for the operation of the engine that are conventionally fastened to the aft section of the fuselage, close to the engine. For example, the integrated system according to the disclosed embodiments comprises the air-conditioning device of the engine, and some or all of the piping which carries the fluids supplying the engine. By fastening the largest number of equipment items that are useful to the engine, no longer on the fuselage but directly on the engine itself, it is possible to eliminate a commensurate number of independent supporting structures around the aft engine. Moreover, the operation of mounting the engine and the auxiliary devices is facilitated, since they are mounted and fastened as a single unit on the fuselage. It is thus possible to reduce the risks of mounting errors and the time required for said mounting.

According to one particular exemplary embodiment of the disclosed embodiments, the upper aft section of the fuselage, intended to support the integrated system according to the disclosed embodiments, has a semicircular, and no longer circular, cross section. The upper surface of the aft section of the fuselage forms a platform on which the integrated system according to the disclosed embodiments is placed before being fastened to the fuselage, the semicircular, lower surface following as a continuation of the bottom section of the fuselage. Thus, the engine does not form a protuberance above the upper part of the fuselage, but on the contrary is integrated within the diameter of the fuselage, such that said fuselage has a substantially continuous circular cross section when the engine according to the disclosed embodiments is secured to the aft section of said fuselage.

One subject of the disclosed embodiments is thus a jet engine for an aircraft, characterized in that it bears at least one stabilizer, said stabilizer being fastened on the rigid structure of said jet engine so as to form a one-piece assembly.

According to exemplary embodiments of the jet engine according to the disclosed embodiments, it is possible to add some or all of the additional features below consisting in:

the stabilizer is fastened to the nozzle of the jet engine;

the one-piece assembly comprises at least one auxiliary device required for the operation of said jet engine, said auxiliary device being fastened on the jet engine;

the base of the stabilizer, fastened to the jet engine, is ventilated by the air used to cool the jet engine.

The disclosed embodiments also relate to an aircraft comprising a jet engine according to the disclosed embodiments in the aft section of the fuselage.

According to exemplary embodiments of the aircraft according to the disclosed embodiments, it is possible to provide some or all of the additional features below:

the jet engine is mounted in cantilever fashion on the aft section of the fuselage, a front section of the jet engine being fastened to the fuselage;

an aft section of the fuselage is beveled so as to form a platform supporting the jet engine.

The disclosed embodiments additionally relate to a method of mounting a jet engine according to the disclosed embodiments on an aircraft, characterized in that it comprises the steps consisting in:

fastening at least one stabilizer on the structure of the jet engine so as to form a one-piece assembly;

mounting and fastening the one-piece assembly on the aft section of the fuselage.

In one particular exemplary embodiment of the method of the disclosed embodiments, the one-piece assembly is mounted radially from above on the aircraft.

According to exemplary embodiments of the method according to the disclosed embodiments, it is possible to provide some or all of the additional steps below:

fastening at least one auxiliary device, which serves for the operation of the jet engine, on said jet engine before mounting and fastening the one-piece assembly on the aft section of the fuselage;

mounting and fastening an air intake on the fuselage, before mounting and fastening the one-piece modular assembly, such that the air intake is upstream of the jet engine;

mounting and fastening an air intake on the fuselage, after having mounted and fastened the one-piece modular assembly, such that the air intake is upstream of the jet engine.

BRIEF DESCRIPTION OF THE DRAWINGS

The disclosed embodiments will be better understood on reading the description which follows and examining the figures which accompany it. These are presented by way of illustration and without any limitation on the disclosed embodiments. The figures represent.

DETAILED DESCRIPTION

Figure 1:
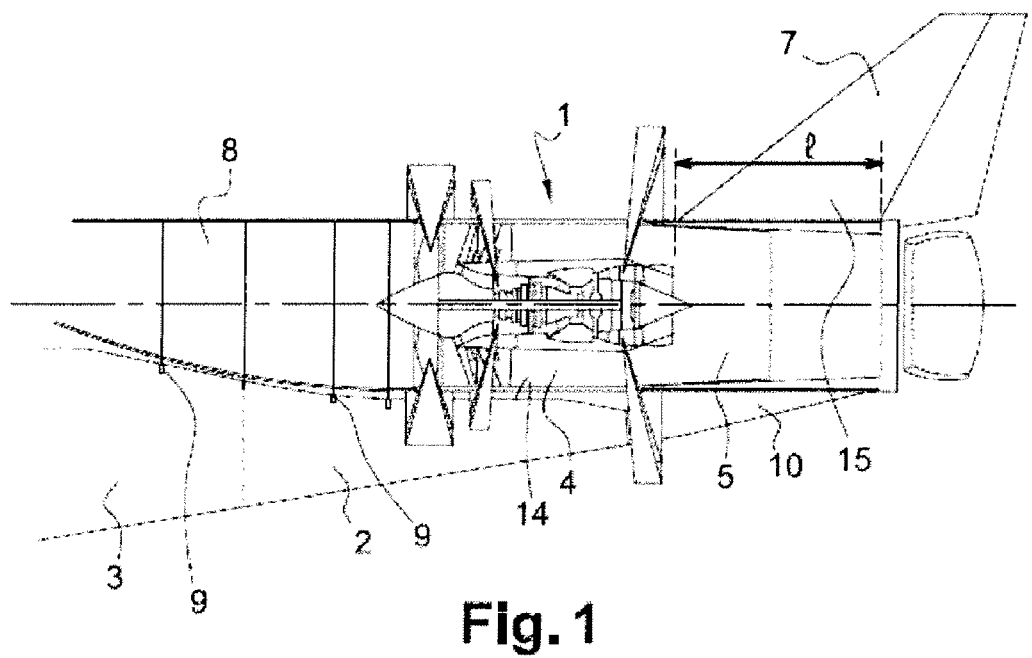
FIG. 1: a longitudinal section of a fuselage aft section provided with a jet engine according to the disclosed embodiments.

FIG. 1 shows a jet engine 1 mounted on an aft section 2 of an aircraft fuselage 3. In a general manner, the terms "front" and "rear/aft" are to be understood with respect to the direction of forward travel of the aircraft provided with the jet engine 1.

The jet engine 1 is mounted in cantilever fashion on the aft section 2 of the fuselage 3. A front section 4 of the jet engine 1 is fastened securely to the aft section 2 of the fuselage 3, while an aft section 5 of said jet engine 1 extends in continuation of the fuselage 3, beyond the aft section 2. The front section 4 of the jet engine 1 can be provided with attachment points connecting said front section 4 of the jet engine 1 of the fuselage 3. The aft section 5, or nozzle, of the jet engine 1 is not fastened to the fuselage 3. In another exemplary embodiment, it is possible to mount the jet engine 1 on the fuselage 3 such that the front section 4 and the aft section 5 are supported by the aft section 2 of the fuselage 3 and, if appropriate, such that the aft section 5 is also fastened on the fuselage 3.

The aft section 5 of the jet engine 1 bears a vertical stabilizer 7, that is to say one which extends vertically with respect to the longitudinal axis of the jet engine 1. A base 15 of the vertical stabilizer 7 is fastened on the aft section 5 of the jet engine 1. There is no attachment point between the vertical stabilizer 7 and the fuselage 3. The stabilizer 7 is held on the fuselage 3 simply by its connection with the aft section 5 of the jet engine 1. Thus, the jet engine 1 and the stabilizer 7 form a one-piece assembly which is itself fastened to the fuselage 3 of an aircraft by attachment points connecting the front section 4 of the jet engine 1 to the aft section 2 of the fuselage 3.

An air intake 8 is arranged upstream of the front section 4 of the jet engine 1 so as to allow air to enter the jet engine 1. The air intake 8 is independent of the jet engine 1, that is to say that it is fastened to the fuselage 3 independently of said jet engine 1 via anchoring points 9. The air intake 8 makes it possible to guide an airflow from outside to inside the jet engine 1.

In the example represented in FIG. 1, the aft section 2 of the fuselage 3 is provided with an aft tip 10 providing the fuselage 3 with aerodynamic continuity. The aft tip 10 is a fairing which does not perform any structural function of the fuselage 3 but has a purely aerodynamic function. The jet engine 1 has no physical connection with the aft tip 10 of the fuselage 3.

As can be seen from FIG. 1, the aft section 2 of the fuselage 3 is beveled so as to form a level platform 14 on which the front section 4 of the jet engine 1 is placed. Thus, the aft section 2 of the fuselage 3 has a semicircular cross section terminated by a flat portion intended to receive the jet engine 1. More precisely, the lower part of the aft section 2 of the fuselage 3 has a circular arc shape, while the upper part is planar. The diameter of the fuselage 3 at the aft section 2 is strictly smaller than the diameter of the fuselage 3 ahead of the aft section 2. The jet engine 1 hence does not form an excessive protuberance above the aft section 2 of the fuselage 3, since it is at least partly integrated within the diameter of said fuselage 3. The aerodynamic drag, due to the presence of this aft jet engine 1, is hence low.

Figure 2:
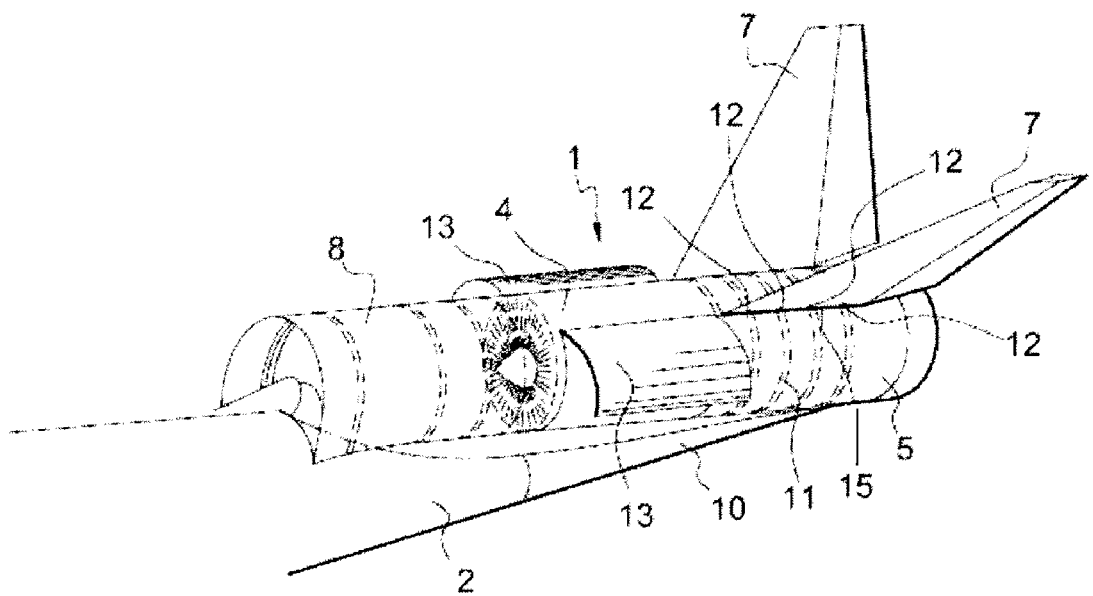
FIG. 2: a schematic representation of a fuselage aft section provided with a jet engine according to the disclosed embodiments.

FIG. 2 shows a side view of the jet engine 1 according to the disclosed embodiments.

The jet engine 1 bears two oblique stabilizers 7. The term "oblique" is to be understood with respect to the longitudinal axis of the jet engine 1. Each stabilizer 7 is securely fastened on the rigid structure of the jet engine 1 at the aft section 5 of said jet engine 1. In the example represented in FIG. 2, each stabilizer 7 is fastened by its base 15, at four anchoring points 12, to the aft section 5 of the jet engine 1. More precisely, the rigid structure of the aft section 5 of the jet engine 1 comprises four hoops 11 which follow a circular cylindrical contour of said aft section 5. Each hoop 11 serves as an anchoring point 12 for an internal spar (not visible) of a stabilizer 7. Thus, each stabilizer 7 is fastened across a full width 1 to the aft section 5 of the jet engine 1. The term "width" is to be understood as that dimension of the stabilizer 7 parallel to the longitudinal axis of the jet engine. Of course, it is possible to provide a larger or smaller number of attachment points 12 for attaching the stabilizers 7 to the hoops 11. For example, it is possible to connect a stabilizer 7 to the jet engine 1 using only two attachment points 12. In that case, the attachment points 12 are preferably situated at the two ends of the width 1 of the stabilizer 7.

The front section 4 of the jet engine 1 further comprises two cowls 13, one right and one left. Each cowl 13 follows a circular arc-shaped contour of a right or left side of the front section 4 of the jet engine 1. In the example represented in FIG. 2, the cowls 13 are movable cowls in the sense that said cowls 13 can open so as to allow access to the inside of the jet engine 1. An upper edge of each cowl 13 is secured to the upper front section 4 of the jet engine 1, while a lower edge is free. The term "lower" is to be understood as meaning directed toward the fuselage 3. The term "upper" is to be understood as meaning directed upwardly, by contrast with lower. The upper edge is, for example, pivotably mounted such that each cowl 13 can pivot from a closed position, in which it extends in continuation of the jet engine 1, to an open position, in which it extends perpendicularly to the longitudinal axis of the jet engine 1. The cowls 13 make it possible to gain access to the inside of the jet engine 1 and to some of the auxiliary devices required for the operation of said jet engine 1.

One or more of the auxiliary devices required for the operation of the jet engine 1 can be fastened directly to the jet engine 1. Thus, together with the jet engine 1 and the stabilizer(s) 7, they form a one-piece assembly 1, 7. It is this one-piece assembly 1, 7 that is fastened to the aft section 2 of the fuselage 3 of the aircraft. More precisely, only the front section 4 of the jet engine 1 of the one-piece assembly 1, 7 is fastened to the fuselage 3, the other elements being connected to said fuselage 3 by way of the jet engine 1 to which they are fastened individually. It is also possible for two or more auxiliary devices to be secured to one another so as to form a modular assembly, said modular assembly then being fastened as a single unit to the jet engine 1.

With the jet engine 1 according to the disclosed embodiments, the technique of mounting said jet engine 1 on the aft section 2 of the fuselage 3 of an aircraft is completely modified in relation to the prior art.

Specifically, the first step is to fasten all the auxiliary elements, comprising the stabilizer(s) 7, and, if appropriate, some or all of the auxiliary devices required for the operation of the jet engine 1, on said jet engine 1. The auxiliary elements are securely fastened to the aft section 5 and/or to the front section 4 of the jet engine 1. Once the one-piece assembly comprising the jet engine 1, the stabilizer(s) 7 and any auxiliary devices has been formed, said one-piece assembly 1, 7 is brought to the fuselage 3. The operation of integrating the jet engine 1 on the fuselage 3 no longer takes place axially parallel to the longitudinal axis of the jet engine 1, but radially, that is to say perpendicularly to the longitudinal axis of the jet engine 1. The one-piece assembly 1, 7 is brought above the aft section 2 of the fuselage 3, for example using a crane, and is then lowered toward the fuselage 3 until it rests on said aft section 2 of the fuselage 3.

The operation of integrating the jet engine 1 according to the disclosed embodiments on the aft section 2 of the fuselage 3 of an aircraft is therefore much easier than in the prior art. Indeed, in the prior art, it was necessary to make sufficient space available for the jet engine 1 to be introduced by translational movement into its housing formed by the hoops connecting the stabilizers to the structure of the fuselage. Moreover, because of this translational movement, it is not possible with the fastening system of the prior art to arrange the jet engine within the diameter of the fuselage, the jet engine forming perforce a protuberance at the rear of the fuselage.

The air intake 8, which is independent of the one-piece assembly 1, 7, can equally well be brought to the fuselage 3 before or after said one-piece assembly 1, 7. The air intake 8 can be brought radially, by translational movement or in some other way to the fuselage 3, insofar as no obstacle impedes its approach.

One of the disadvantages of fastening a stabilizer 7 directly on the rigid structure of the jet engine 1 is the risk of said stabilizer 7 overheating and melting at the connection between the stabilizer 7 and the jet engine 1. Specifically, since the base 15 of the stabilizer 7 is secured to the aft section 5 of the jet engine 1, it is in direct and permanent contact with a heat source which may reach temperatures in the region of 800° C. Hence, to avoid the disadvantages due to overheating, and particularly to the melting of the attachment points 12 or materials forming the stabilizer 7, it is possible to provide a ventilation mechanism for ventilating the base 15 of the stabilizer 7. Advantageously, this ventilation system uses the air used to cool the jet engine 1. Preferably, at least the base 15 of the stabilizer 7 and the points 12 of attachment to the aft section 5 of the jet engine 1 are made of materials which are resistant to high temperatures, such as titanium, for example. It is also possible for the stabilizer 7, or at least its upper part not connected to the jet engine 1, to be made of composite materials.

The invention claimed is:

1. A jet engine for an aircraft, comprising at least one stabilizer and a rigid structure, said stabilizer being ulteriorly fastened on the rigid structure of said jet engine so as to form a one-piece assembly.

2. The jet engine according to claim 1, further comprising that the stabilizer is fastened to the nozzle of the jet engine.

3. The jet engine according to claim 1, further comprising that the one-piece assembly comprises at least one auxiliary device required for the operation of said jet engine, said auxiliary device being fastened on the jet engine.

4. The jet engine according to claim 1, further comprising that the base of the stabilizer, fastened to the jet engine, is ventilated by the air used to cool the jet engine.

5. An aircraft comprising a jet engine according to claim 1 in the aft section of the fuselage, the jet engine comprising at least one stabilizer and a rigid structure, said stabilizer being fastened on the rigid structure of said jet engine so as to form a one-piece assembly.

6. The aircraft according to claim 5, wherein the jet engine is mounted in cantilever fashion on the aft section of the fuselage, a front section of the jet engine being fastened to the fuselage.

7. The aircraft according to claim 5, wherein the aft section of the fuselage is beveled so as to form a platform supporting the jet engine.

8. A method of mounting a jet engine on an aircraft, the jet engine comprising at least one stabilizer and a rigid structure, said stabilizer being ulteriorly fastened on the rigid structure of said jet engine so as to form a one-piece assembly, the method comprising:
fastening at least one stabilizer on the structure of the jet engine so as to form a one-piece assembly;
mounting and fastening the one-piece assembly on the aft section of the fuselage.

9. The method according to claim 8, wherein the one-piece assembly is mounted radially from above on the aircraft.

10. Method according to claim 8, further comprising:
fastening at least one auxiliary device, which serves for the operation of the jet engine, on said jet engine before mounting and fastening the one-piece assembly on the aft section of the fuselage.

11. The method according to claim 8, further comprising:
mounting and fastening an air intake on the fuselage, before mounting and fastening the one-piece assembly, such that the air intake is upstream of the jet engine.

12. The method according to claim 8, further comprising:
mounting and fastening an air intake on the fuselage, after having mounted and fastened the one-piece modular assembly, such that the air intake is upstream of the jet engine.

* * * * *